UNITED STATES PATENT OFFICE 2,462,398

IRISH MOSS EXTRACT AND ITS PRODUCTION

Mattie P. Hess, Maywood, and Arthur E. Siehrs, Chicago, Ill., assignors, by mesne assignments, to Krim-Ko Corporation, Chicago, Ill., a corporation of Illinois No Drawing. Application March 1, 1945, Serial No. 580,492

5 Claims. (Cl. 99—142)

The current invention relates to certain valuable discoveries in connection with the treatment of marine-plants, more particularly that type commonly known as carrageen or Irish moss, the present novel procedure resulting in the production of a gelose or mucilaginous extract from such Irish moss, which, when incorporated in a chocolate-flavor syrup, can be mixed, without heating, with cold milk to provide a suitable stabilized chocolate-flavor milk in which the cocoa-particles will remain substantially-uniformly suspended over an indefinite period.

The discovery is based on the theory that such mosses contain or embody at least two extractable substances, hereinafter designated by the letters "A" and "B," respectively, of different functional properties.

Such Extract A is a gel-forming substance which, when incorporated in a chocolate-flavor syrup and the latter mixed with milk, will exert its maximum suspending effect on the cocoa-particles of the drink only after such mixture of milk and syrup is suitably heated, such heating in commercial practices being usually designated as 145° Fahr. for thirty minutes, although lower temperatures may be used, but longer periods of mixing are then necessary to attain the same effect. However, it is not possible to mix this type of chocolate-flavor syrup containing Extract A with a cold mixture, that is, for example, with milk at 36° Fahr. and have suspension of the cocoa-particles occur in the resulting product.

On the other hand, Extract B provides its paramount or maximum suspending or sustaining effect when the chocolate-flavor syrup containing it is mixed with cold milk at about 36° Fahr. and, in this case, this different extract B will immediately begin to apply its suspending power and it is possible to obtain thereby commercially-stable chocolate-flavor milk without the necessity of applying heat as is required in the case of the use of Extract A.

Different mosses, or the same mosses grown under different conditions of nutrition and temperature, or a single moss in varying stages of development, may yield different amounts of the extracts A and B, it being borne in mind, that normally, neither the sources of extract A nor B are soluble in sea-water, probably because of the suppressing influence of the salts in the sea-water.

The current invention provides a procedure for obtaining the heretofore unknown and therefore unavailable product B from the moss in commercially substantial quantities so that the extract can be employed for its special purposes such as the suspension of fibrous materials in aqueous media, for example, cocoa in milk at a dairy providing a cold process chocolate-flavor drink, pharmaceutical-emulsions, ice cream, etc. and all of the uses of Extract A where it is disadvantageous to employ a heating or cooking process or where the viscosity must be maintained low.

The improved modus operandi resulting from the present discovery provides a substantial increase in a valuable product produced from the moss over that procurable by other procedures.

The current important revelation is founded on the fact that the refuse or residue resulting from the segregation of the extractable substances from Irish moss in a heated or boiling water-solution at atmospheric pressure still contains large amounts of potential product not obtainable by ordinary means, and, in the case of the large majority of mosses grown in the coastal waters of North America this unreleased or heretofore unavailable substance is primarily Extract B, our investigations and experiments having indicated that this source of Extract B is locked up in the fibers of the residue in such a manner as to prevent its procurement by heat at 212° F.

Considered somewhat differently, our invention, more particularly, refers to water-extractions of Irish moss whose dried solids react with some of the constituents of cold milk to provide the required stabilizing effect.

It is therefore one of the principal objects of our invention to provide a form of dried extract offering the valuable thickening and stabilizing properties inherent in Irish moss, a further purpose of the invention being to provide a stabilizing substance made from Irish moss which may be introduced directly into dairy product compositions without modification of the usual manufacturing procedures or the subjecting of the compositions to heating.

Another important aim of the invention is to utilize profitably the by-product extraction residues resulting from the preparation of the conventional Irish moss extracts, an added salient feature of the invention being to increase the total yield of commercially-utilizable extract that may be obtained from the Irish moss.

If the moss is subjected to the action of hot-water at a temperature, for example, from 180° Fahr. to 212° Fahr. substantially all of the Extract A will be withdrawn therefrom and form a solution with the water, and, in addition, an amount of the substance B will be extracted and also go into the solution, but the amount of Extract B in such solution will depend upon the quantity thereof which is free to be extracted into a hot water-solution at atmospheric pressure.

If this aqueous double-extract of the moss is then dried to a solid, or if the soluble double-extract is prepared in dry form by any convenient means, the resulting product will have the properties of Extract A and Extract B in proportion to the percentages of these substances present in the dried product. So far as is known, up to the present time, neither Extract A nor Extract B has been isolated by anyone except the present inventors.

It is highly desirable to produce Extract B in as pure a form as possible, because in numerous cases the presence of Extract A is detrimental to the use of the Irish moss extract when the Extract B properties alone are desired.

An example of this, as indicated above, is the case of a chocolate-flavor syrup which is designed to be mixed, without heating, with cold milk so that a stabilized chocolate-flavor milk will be produced without the necessity of heating the mixture. If the extract prepared from Irish moss contains a substantial portion of Extract B then such a suitable chocolate-flavor syrup can be made, but if the extract contains a fairly large amount of Extract A, then the resulting syrup will be very thick and it will be necessary to use greater amounts of the mixed extract in order to obtain the desired cold suspending strength. As the proportion of Extract A becomes greater in the dried extract, the syrup becomes too thick to be useful commercially and the cost of the stabilizing-agent becomes greater. For this reason, it is highly desirable to have a dried Extract B in as pure a state as possible, so that the resulting chocolate-syrup in which it is used will be very thin and the amount of stabilizing or suspending agent required will be low.

We have been able to obtain such a dried Extract B by following either one of two procedures: (1) subjecting the residues of prior 180° Fahr. extraction to further extraction and at greater than atmospheric-pressure, or (2) treating the residues of prior 180° Fahr. extraction chemically by a suitable re-agent, such as sulfite, in the proper manner, and subsequently extracting at a temperature such, for instance, as 180° Fahr., this second procedure constituting the subject matter of our copending patent application Serial No. 787,476, filed November 21, 1947.

In following the first, above-mentioned supplemental procedure, the Irish moss is initially subjected to water-extraction by the conventional procedure, using a temperature, such as 180° Fahr., so that all of its Extract A and as much of its Extract B as is segregatable under such conditions is removed or extracted from the moss. This extraction may be repeated a second time to be sure to remove all of the Extract A possible. The moss residue and water are then subjected to about fifteen pounds pressure above atmospheric-pressure in an autoclave for a period of about one hour, this being a practical length of time giving good results, the use of a lesser pressure even for longer periods of time resulting in decreased yields, whereas greater pressures are as effective in shorter periods of time.

Experiments along the line indicated above are shown in the table.

Table

| Temperature of Extraction | Time | Yield | Viscosity of Cold Milk Using a 0.6% Syrup |
|---|---|---|---|
| | | Per cent | |
| Whole Moss: 180° F | 60 min | 65 | 26.0 Seconds-settling. |
| Residue: | | | |
| 180° F | 60 min | 51.8 | 25.0 Seconds. |
| 212° F | 60 min | 53.2 | 37 Seconds. |
| 227° F., 5# Pressure | 60 min | 46.0 | 58 Seconds. |
| 244° F., 12# Pressure | 5 min | 17.0 | 89 Seconds. |
| 244° F., 12# Pressure | 15 min | 28.0 | 69 Seconds. |
| 244° F., 12# Pressure | 30 min | 44.0 | 72 Seconds. |
| 244° F., 12# Pressure | 60 min | 56 | 76 Seconds. |
| 244° F., 12# Pressure | 90 min | 70 | 34 Seconds. |
| 244° F., 12# Pressure | 2 hrs | 54 | 36 Seconds. |
| 244° F., 12# Pressure | 3 hrs | 43.6 | 29 Seconds-Settling. |
| 252° F., 16# Pressure | 15 min | 54.8 | 60 Seconds. |
| 252° F., 16# Pressure | 30 min | 58.0 | 87 Seconds. |
| 252° F., 16# Pressure | 60 min | 62.8 | 64 Seconds. |
| 252° F., 16# Pressure | 2 hrs | 56.8 | 38 Seconds-Settling. |

These experiments were carried out by first thoroughly washing the raw, whole, unwashed, Irish moss and then extracting at 180° Fahr. for one hour in an approximate 3% water-soluble, three pounds of moss being used with 97 pounds of water. At the end of this time, the extracted material was drained away from the moss residue and the latter washed thoroughly with warm water, drained again, and such residue then dried in a shelf-dryer employing a fan and hot-air. Enough of this extract was prepared at one time so that it could be used in the complete set of experiments. This dried residue was then mixed with water to form a 4% solution and extracted at various temperatures and pressures for different periods of time, the material during such treatment being agitated to assure uniform extraction. After extraction the liquid was filtered and such liquid extract dried and powdered.

Tests were carried out on the dried powdered extract and are reported in the table, the method of testing the extract being to use the dried material in making up a cold mixed chocolate-flavor syrup using 0.6% by weight of the stabilizer to be tested, mixing such chocolate-flavor syrup with milk under a standard procedure and then determining whether settling of the cocoa-particles occurred and determining the viscosity of the finished chocolate-flavor milk (right-hand column).

The table shows in its first line that when an extract was made from black Scituate moss at 180° Fahr. for sixty minutes a yield of dry extract constituting 65% by weight of the amount of dry moss employed was obtained, but such extract showed no cold-mix properties.

When, however, an extract was obtained, from the residue of the preceding extraction, during a period of sixty minutes at 180° Fahr., a yield of 51.8% of the moss was extracted but again such extract showed no cold-mix properties. When such an extraction was carried out at 212° Fahr. an extract yield of 53.2% was had and cold-mix properties began to appear in the extract as indicated by the 37 seconds.

When the temperature was raised to 227° Fahr. and a pressure of 5 pounds, above atmospheric pressure, per square-inch was used a yield of 46% was obtained in 60 minutes and the cold-mix properties raised quite markedly as shown by a milk-viscosity of 58 seconds. When the temperature was elevated to 244° Fahr. under a pressure of 12 pounds per square-inch above atmospheric pressure, the yield increased to 56% for 60 minutes extraction time and the cold-mix properties increased still further as represented by the viscosity of 76 seconds.

However, when the temperature was increased to 252° Fahr. at 16 pounds pressure per square-inch above atmospheric pressure for 60 minutes the yield increased slightly to 62.8% but there was no significant change in the strength of the extract, this seeming to indicate that if the extraction time is kept to sixty minutes that there is not much difference between 244° and 252° Fahr.

There is no over-all increase in strength or yield with increasing temperatures and there is no indication that the cold-mix properties may be destroyed faster at 16 pounds pressure per square-inch, at 252° Fahr., than is the case of 12 pounds pressure per square-inch and 244° Fahr.

With respect to the influence of time on the extraction, it appears as though there is a definite curve for each temperature, in which the yield and strength reach a maximum and then taper off with increasing time.

It is seemingly of the essence of our discovery that the refuse or fibrous residues, resulting from the prior extraction of crude Irish moss with hot or boiling water still contain large amounts of colloidal substance of high viscosity and stabilizing capacity which is not recoverable by ordinary methods. Whether this substance characterized as Extract B herein is initially locked up in the fiber of the moss in a manner which precludes its extraction by a simple boiling, or is some new cleavage product formed from the fiber or from some other initially insoluble substance not initially obtainable is at present conjectural.

We have found that the Irish moss exhausted residues of boiling-water-extractions may be made to yield, under suitable conditions of processing, large increments of extract not heretofore obtainable either from the residues or from the whole moss by any of the usual known means.

Our novel process comprises subjecting the moss residue to aqueous extraction under conditions which favor molecular or structural cleavage while at the same time inhibiting hydrolysis in each of the two indicated supplemental procedures, the reaction, whatever it may be, being evidenced by a profound physical change in the moss refuse undergoing extraction in that it loses its brittleness and becomes soft and pliable and, with the release of the colloidal principle, the surface of the moss becomes slimy to the touch, these changes not occurring when exhausted moss fiber is boiled in water in the usual manner.

This is seemingly evidence of a chemical change in the colloidal constituents of the treated residue.

As indicated in the table, this is apparently borne out by the established fact that although the percentage yield from the residue is approximately the same (53.2) at 212° F. at atmospheric pressure as that (54.8) at 252° F. at 16 pounds pressure above atmospheric pressure, the former having practically no cold-mix properties (37 seconds) whereas, the latter has excellent cold-mix characteristics (60 seconds).

About 0.5% to 1.0% of the weight of the syrup of the "B" extract is dissolved in the syrup while the latter is hot, that is, at the time the syrup is made, the latter not ordinarily being susceptible of production cold.

All cold mixed syrups now in the trade can be used either cold or hot but not necessarily equally favorably.

If the syrup contains only Extract B then the syrup can be used satisfactorily either hot or cold, but if the syrup also contains an appreciable amount of Extract A then it cannot be gratifyingly used with heated milk, the reason being that when a syrup containing Extract A is heated with milk and subsequently cooled, the product may be too thick to be satisfactory commercially, one distinction between Extracts A and B being that the former is a gelling agent and the latter a non-gelling agent.

It is seemingly new to provide a product consisting of Extract B only, either in the form of powder, or dissolved in water, or dissolved in chocolate syrup.

In passing, it may be mentioned that the ash-content, by which is meant the weight of material remaining after Extract B has been burned, of this new product obtained by the pressure-extraction is desirably much lower than in Irish moss extracts prepared by any other known means up to the present time. This is also true of the nitrogenous and fatty materials.

Moreover, Extract A is probably a colloidal substance plus other colloidal or non-colloidal substances which may modify the properties of such extract, whereas Extract B is seemingly purely colloidal.

We claim:

1. The carbohydrate Irish moss extract characterized by the fact that when a quantity thereof, corresponding to approximately 2.6 grams thereof in dry powdered form, is added to and thoroughly intermixed with 16 ounces of 36° Fahr. milk such extract will within about thirty seconds begin to apply its suspending and thickening power to the milk, such extract being derived from Irish moss residue which has been previously freed from at least 80% of all Irish moss constituents extractible from the moss by hot fresh water at atmospheric pressure, by subjecting such residue to supersaturated steam at a pressure between about five pounds and fifty pounds per square inch above atmospheric pressure.

2. The carbohydrate Irish moss extract dissolved in syrup in the ratio of about ½% to 1% of the weight of the syrup characterized by the fact that when one part by volume of such extract-charged syrup is added to and thoroughly intermixed with about ten parts by volume of 36° Fahr. milk such extract will within about thirty seconds begin to apply its suspending and thickening power to the milk, such extract being derived from Irish moss residue which has been previously freed from at least 80% of all Irish moss constituents extractible from the moss by hot fresh water at atmospheric pressure, by subjecting such residue to supersaturated steam at a pressure between about five pounds and fifty pounds per square-inch above atmospheric pressure.

3. The novel process of extracting a carbohydrate product by subjecting the Irish moss residue, which has been previously freed from substantially all of the constituents of the Irish moss extractible by fresh hot water at atmospheric pressure, to the action of supersaturated steam at a pressure of about 5 pounds to 50 pounds per square-inch above atmospheric pressure.

4. The novel process of extracting a carbohydrate product by subjecting the Irish moss residue, which has been previously freed from at least 80% of all of the constituents of the Irish moss extractible by fresh hot water at atmospheric pressure, to the action of supersaturated steam at a pressure of about 5 pounds to 50 pounds per square-inch above atmospheric pressure.

5. The novel process set forth in claim 3, in which said supersaturated steam is applied to said residue for a period of about one hour.

MATTIE P. HESS.
ARTHUR E. SIEHRS.

REFERENCES CITED

The following references are of record in the file of this patent:

UNITED STATES PATENTS

| Number | Name | Date |
|---|---|---|
| 2,337,562 | Lund | Dec. 28, 1943 |

OTHER REFERENCES

Jour. Chem. Soc. (London), 1943, pages 51–54.